(12) United States Patent
Uhlianuk et al.

(10) Patent No.: US 10,752,786 B2
(45) Date of Patent: Aug. 25, 2020

(54) COATING COMPOSITIONS FOR COIL COATING, METHODS FOR MAKING SUCH COATING COMPOSITIONS AND COIL COATING METHODS

(71) Applicant: AXALTA COATING SYSTEMS IP CO., LLC, Wilmington, DE (US)

(72) Inventors: Peter W. Uhlianuk, Romeo, MI (US); Eric Calhoun, Romeo, MI (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 224 days.

(21) Appl. No.: 15/658,303

(22) Filed: Jul. 24, 2017

(65) Prior Publication Data

US 2018/0022935 A1 Jan. 25, 2018

Related U.S. Application Data

(60) Provisional application No. 62/365,616, filed on Jul. 22, 2016.

(51) Int. Cl.
*C09D 5/08* (2006.01)
*C09D 163/00* (2006.01)
(Continued)

(52) U.S. Cl.
CPC ............. *C09D 5/08* (2013.01); *B05D 3/0254* (2013.01); *B05D 3/102* (2013.01); *C09D 17/002* (2013.01); *C09D 163/00* (2013.01); B05D 3/0272 (2013.01); B05D 7/14 (2013.01); B05D 7/546 (2013.01); B05D 2202/10 (2013.01); B05D 2252/02 (2013.01); B05D 2401/10 (2013.01); B05D 2503/00 (2013.01); B05D 2504/00 (2013.01); B05D 2505/00 (2013.01)

(58) Field of Classification Search
CPC ...... C09D 5/08; C09D 17/002; C09D 163/00; B05D 3/0254; B05D 3/102; B05D 3/0272; B05D 7/14; B05D 7/546; B05D 2202/10; B05D 2252/02; B05D 2401/10; B05D 2503/00; B05D 2504/00; B05D 2505/00
See application file for complete search history.

(56) References Cited

U.S. PATENT DOCUMENTS 3,593,848 A 7/1971 Landau
4,419,467 A 12/1983 Wismer et al.
(Continued)

OTHER PUBLICATIONS

USPTO, Final Office Action in U.S. Appl. No. 15/377,584 dated Oct. 20, 2017.

*Primary Examiner* — Robert S Walters, Jr.
(74) *Attorney, Agent, or Firm* — Lorenz & Kopf, LLP

(57) ABSTRACT

Coating compositions for coil coating, methods for making such coating compositions and coil coating methods are provided. In an exemplary embodiment, a coating composition includes an organic solvent carrier and a film-forming binder dispersed in the organic solvent carrier. The film-forming binder contains an epoxy-amine adduct and a blocked or unblocked polyisocyanate crosslinking agent. The film-forming binder has associated amine groups until subjected to a temperature of at least about 165.5° C. (330° F.). The coating composition also contains a pigment and a grinding resin. The coating composition has a solids content of at least about 50 wt. % based on a total weight of the coating composition.

12 Claims, 1 Drawing Sheet

(51) Int. Cl.
*C09D 17/00* (2006.01)
*B05D 3/10* (2006.01)
*B05D 3/02* (2006.01)
B05D 7/14 (2006.01)
B05D 7/00 (2006.01)

(56) References Cited

U.S. PATENT DOCUMENTS

| | | | |
|---|---|---|---|
| 5,605,974 A | 2/1997 | Carpenter et al. | |
| 6,607,646 B2 | 8/2003 | Gam | |
| 2015/0337074 A1* | 11/2015 | Uhlianuk | C08G 59/184 427/327 |

* cited by examiner

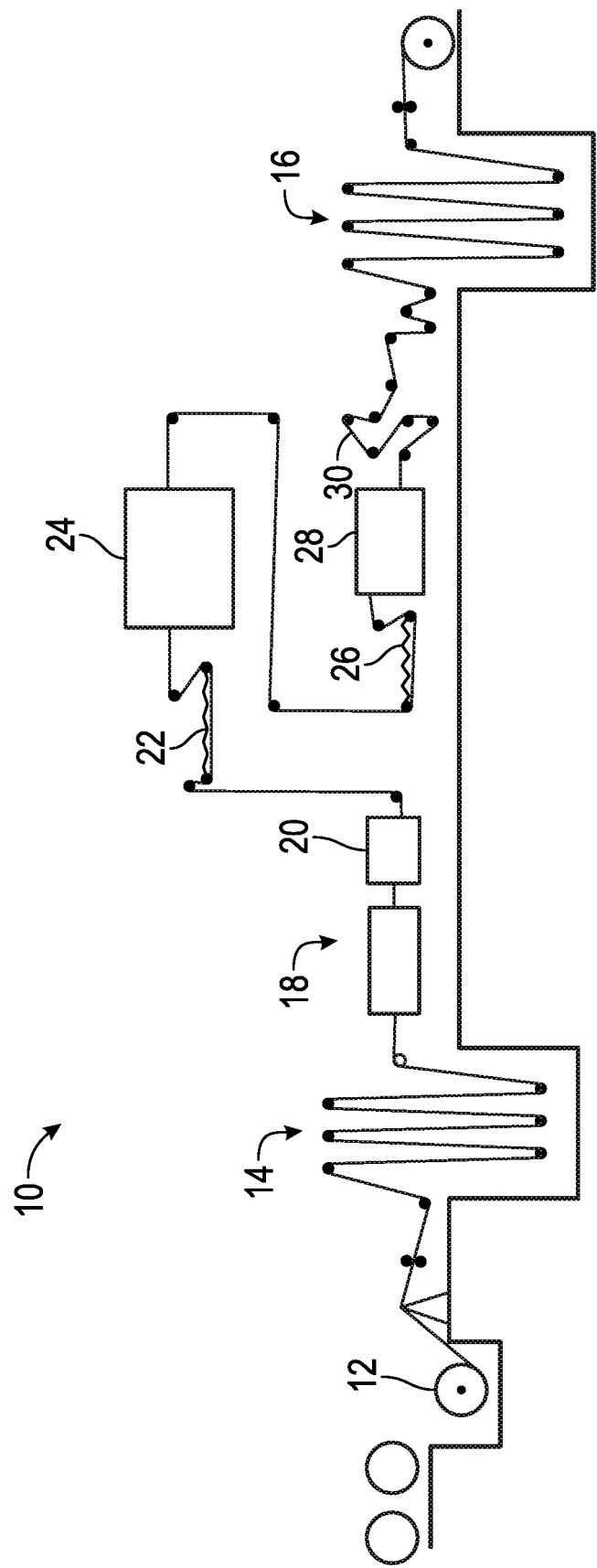

COATING COMPOSITIONS FOR COIL COATING, METHODS FOR MAKING SUCH COATING COMPOSITIONS AND COIL COATING METHODS

CROSS-REFERENCE TO RELATED APPLICATION

This Applications claims the benefit of U.S. provisional patent application Ser. No. 62/365,616, filed on Jul. 22, 2016, the contents of which are herein incorporated by reference in their entirety.

TECHNICAL FIELD

The present disclosure generally relates to coating compositions, methods for making coating compositions, and processes for using coating compositions, and more particularly relates to coating compositions for coil coating, methods for making coating compositions for coil coating, and coil coating methods.

BACKGROUND

Coil coating is a continuous, automated process for coating metal with a primer, a bottom coat of paint, or a top coat of paint before fabrication into end products. The metal substrate, typically steel or aluminum, is delivered in coil form from a rolling mill. The metal coil is positioned at the beginning of a coating line, and in one continuous process, the coil is unwound, pre-cleaned, pre-treated, pre-primed, and pre-painted, typically using roller coating, before being recoiled at the end of the coating line and packaged for shipment. This process can be performed at up to about 213 meters (700 feet) per second.

Conventional coil coating paints (referred to herein as "coating compositions") suffer from several drawbacks. For example, corrosion of the metal after coating is an on-going problem. ASTM D3794-13 describes a collection of methods used within the coil coatings industry to test for corrosion resistance. One such method is salt-spray testing, where the coated coil is sprayed with a salt solution for a period of time. Prior art coatings may only resist corrosion in such salt spray for a time period of less than 24 hours, which is undesirably short. Moreover, another such method is methyl-ethyl-ketone (MEK) "rubbing", where the coated coil is rubbed with MEK solvent. Prior art coatings may only resist corrosion against such rubbing for less than ten rubs, which is undesirably few.

Accordingly, it is desirable to provide a coil coating composition with a relatively high solids content that exhibits improved corrosion resistance after the coil coating process (for example, greater than 1000 hours salt spray resistance, and greater than 200 MEK rubs resistance). In addition, it is desirable to provide a method for manufacturing such a coating composition. It also is desirable to provide a coil coating process using such a coating composition. Furthermore, other desirable features and characteristics will become apparent from the subsequent detailed description and the appended claims, taken in conjunction with the accompanying drawings and this background.

BRIEF SUMMARY

Coating compositions for coil coating, methods for making such coating compositions and coil coating methods are provided. In an exemplary embodiment, a coating composition includes an organic solvent carrier and a film-forming binder dispersed in the aqueous carrier. The film-forming binder contains an epoxy-amine adduct and a blocked or unblocked polyisocyanate crosslinking agent. The film-forming binder has associated amine groups until subjected to a temperature of at least about 165.5° C. (330° F.). The coating composition also contains a pigment and a grinding resin. The coating composition has a solids content of at least about 50 wt. % based on a total weight of the coating composition.

In another exemplary embodiment, a method for making a coating composition includes combining a polyepoxide and a polyether polyol to form a mixture and heating the mixture. A crosslinking agent is added to the mixture and a cationic group former is added to the mixture, to form a film-forming binder. The film-forming binder is combined with a pigment paste. The coating composition has a solids content of at least about 50 weight percent based on a total weight of the coating composition. The film-forming binder has associated amine groups until subjected to a temperature of at least about 165.5° C. (330° F.).

In a further exemplary embodiment, a method for coil coating a metal coil includes unwinding a metal strip from a coil thereof. The metal strip is cleaned and at least one surface of the metal strip is coated with a coating composition to form a coated metal strip. The coating composition includes an organic solvent carrier and a film-forming binder dispersed in the organic solvent carrier. The film-forming binder contains an epoxy-amine adduct and a blocked polyisocyanate crosslinking agent. The film-forming binder has associated amine groups until subjected to a temperature of at least about 165.5° C. (330° F.). The film-forming binder also contains a pigment and a grinding resin. The coating composition has a solids content of at least about 50 weight percent based on a total weight of the coating composition. The coated metal strip is heated.

BRIEF DESCRIPTION OF THE DRAWING

The present disclosure will hereinafter be described in conjunction with the following drawing FIGURE, wherein like numerals denote like elements, and wherein:

The FIGURE is a side view schematic of a coil coating process.

DETAILED DESCRIPTION

The following detailed description is merely exemplary in nature and is not intended to limit the disclosure or the application and uses of the disclosure. Furthermore, there is no intention to be bound by any theory presented in the preceding background or the following detailed description.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

Various embodiments contemplated herein relate to coating compositions for use in coil coating. Unlike conventional coating compositions used for coil coating, the coating compositions contemplated herein have nonvolatile solids contents of at least about 50 weight percent (wt. %), such as at least about 70 wt. %, based on the total weight of the coating compositions. In this regard, the coating compositions contemplated herein exhibit superior corrosion resistance as compared with conventional coating compositions. The higher solids content of the coating compositions contemplated herein further translates into a lower VOC content as compared with conventional coating compositions. While the coating compositions set forth herein are described as useful for coil coating processes, it will be appreciated that the coating compositions are not so limited and can be used for the coating and/or painting of most, if not all, metal structures, for example, stamped metal parts, such as those manufactured and used in the automobile industry, extruded metal parts, molded metal parts, and the like in any painting process such as spray painting, dip painting, roller painting, brush painting, and the like.

Furthermore, various embodiments contemplated herein may be used in either a 1K coating composition or a 2K coating composition. The term "one-pack coating composition" or "1K coating composition" refers to a coating composition having one package that can be stored for a certain shelf life. 1K coating compositions can include blocked crosslinking agents such as blocked isocyanates, as known in coating industry. The term "two-pack coating composition" or "2K coating composition" refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as a coil. After application, the layer dries and cures at ambient or at elevated temperatures to form a coating on the substrate surface having desired coating properties. 2K coating compositions can include unblocked crosslinking agents such as unblocked isocyanates, as known in the coating industry.

A side view schematic of a coil coating process 10 is illustrated in FIG. 1. The coil coating process is a continuous feeding operation with a metal strip of the coil fed through the entire coating process. The metal strip may be a strip of steel, aluminum, cast iron, or other metal or metal alloy. A coil 12 is first fed into an entrance accumulator tower 14 and, after coating, is fed into an exit accumulator tower 16, with the accumulator towers 14, 16 allowing the coating operation to continue at constant speed even when intake of the metal strip of the coil 12 is delayed, for example to start a new roll, or when winding of the metal strip after coating is delayed, for example to cut the metal to end one roll and begin a new roll. The metal strip of the coil 12 is generally cleaned to remove oil or debris and pretreated at a pretreatment station 18 and dried in a dryer 20. The metal strip then is primed on one or both sides of the strip with a primer 22 and baked in a curing oven 24 to cure the primer. Subsequently, the metal strip is coated at least on one side with a top coat composition 26. The metal strip typically is coated by roller coating but can also be coated by brush coating, spray coating, dip coating, and the like. A separate backer or a different topcoat may be applied on the other side of the metal strip. The topcoat composition 26 is deposited to a thickness of from about 15.24 microns (um) (0.6 mils) to about 25.4 um (1 mil). The topcoat composition 26 may be baked in a finishing oven 28 at a temperature of from about 204.4° C. (400° F.) to about 537.8° C. (1000° F.) and quenched in a water quench 30. The metal strip then is fed into the exit accumulator tower 16 and from there is re-rolled.

In accordance with an exemplary embodiment, the coating composition used in the coil coating process, that is, the top coat composition 26, contains a film-forming binder, an organic solvent carrier that includes less than about 20 wt. % water (based on total weight of the solvent), a pigment, and a grind resin. An exemplary film-forming binder of the principal emulsion used to form the coating composition is an epoxy amine adduct and a blocked or unblocked (depending on whether a 1K or 2K composition is desired) polyisocyanate crosslinking agent and is dispersed in the organic solvent medium. The binder is present in amounts of from about 30 to about 50% by weight of solids. The film-forming binder of the coating composition contemplated herein is formed from contacting and heating together a polyepoxide with a polymeric polyol, described below, the reaction product of which is chain extended followed by reaction with a cationic base group former, such as an amine, also described below. The resulting reaction product then is combined with a blocked or unblocked cross-linking agent.

The polyepoxide resins that are used to form the film-forming binder are polymers having a 1,2-epoxy equivalency greater than one, for example, about two, that is, polyepoxides that have on an average basis two epoxy groups per molecule. Exemplary polyepoxides are polyglycidyl ethers of cyclic polyols. Particularly suitable are polyglycidyl ethers of polyhydric phenols such as bisphenol A. These polyepoxides can be produced by etherification of polyhydric phenols with epichlorohydrin or dichlorohydrin in the presence of alkali. Examples of polyhydric phenols are 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynapthyl) methane, 1,5-dihydroxy-3-naphthalene, or the like. Examples of other cyclic polyols include alicyclic polyols, particularly cycloaliphatic polyols, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like. The polyepoxides have molecular weights of at least about 200, for example from about 200 to about 2000, such as about 340 to about 2000.

In an exemplary embodiment, the polymeric polyol that is contacted and heated with the polyepoxide is a polyether polyol formed from reacting a cyclic polyol with ethylene oxide. Optionally, the polyether polyol can be formed by reacting a cyclic polyol with a mixture of ethylene oxide and an alkylene oxide having 3 to 4 carbon atoms in the alkylene chain.

An exemplary polyether polyol is prepared by techniques known in the art. Typical reaction conditions are as follows: The cyclic polyol is charged to a reactor capable of maintaining pressure. If the cyclic polyol is a liquid or low melting solid, for example, cyclohexanedimethanol, the cyclic polyol can be added to the reactor neat. If the cyclic polyol is a solid or a high viscosity liquid, the cyclic polyol can be dissolved in a suitable solvent. For example, bisphenol A can be dissolved as a 50 percent solution in methyl isobutyl ketone. Resorcinol can be dissolved in water. A catalyst such as a tertiary amine, for example, N,N'-dimethylcyclohexylamine, or an alkali metal hydroxide, for example, sodium hydroxide or potassium hydroxide, may be added to the reaction mixture in an amount of about 0.5 to 2 percent by weight based on total weight of the reaction mixture. The cyclic polyol may be heated to about 82° C. (180° F.) to about 104° C. (219° F.) and the reactor pressured with nitrogen to a pressure of from about 2.8 to about 4.2 kilograms per square centimeter ($kg/cm^2$) (about 40 to about 60 pounds per square inch (psi)).

In an exemplary embodiment, ethylene oxide also under pressure, such as at about 5.6 to about 7.0 $kg/cm^2$ (about 80 to about 100 psi), is fed into the reactor slowly in an incremental manner with cooling to remove the exothermic heat obtained when the ethylene oxide reacts with the cyclic polyol. Throughout the addition that lasts about 3 to 4 hours, the temperature of the reaction vessel is kept at about 82 (180° F.) to about 121° C. (250° F.). At the completion of the ethylene oxide addition, the reaction mixture is held for about 1 to 2 hours at about 93 (199° F.)-121° C. (250° F.) to complete the reaction. If present, solvent may be stripped off and if sodium hydroxide or potassium hydroxide catalyst was used, the catalyst(s) can be neutralized with acid, for example, phosphoric acid, and the salt filtered off. If a mixture of ethylene oxide and higher carbon-number alkylene oxide is used, in an embodiment, the reaction proceeds first with the higher carbon-number alkylene oxide and then with the ethylene oxide.

Examples of the cyclic polyols that can be used are polyhydric phenols and cycloaliphatic polyols such as those mentioned above in connection with the preparation of the polyepoxides. Also, cyclic polyols such as the aromatic diols, resorcinol, the aryl-alkyl diols such as the various isomeric xylene diols and heterocyclic diols such as 1,4-piperizine diethanol can be used.

As mentioned above, besides ethylene oxide, mixtures of ethylene oxide and an alkylene oxide containing from 3 to 6, such as 3 to 4 carbon atoms in the alkylene chain can be used. Examples of such alkylene oxides are 1-2-propylene oxide, 1-methyl-1,2-propylene oxide, propylene oxide, 1,2-butylene oxide, butadiene monoepoxide, epichlorohydrin, glycidol, cyclohexane oxide and styrene oxide. An exemplary alkylene oxide is 1,2-propylene oxide.

In an embodiment, the cyclic polyol-alkylene oxide condensate is difunctional or trifunctional, that is, the condensate contains an average of 2 to 3 hydroxyl groups per molecule. Higher functional polyethers can be employed, although gelation could pose a challenge. An example of a higher functionality polyether is the reaction product of a cyclic polyol such as sucrose with ethylene oxide.

The equivalent ratio of cyclic polyol to alkylene oxide should be from about 1:3 to about 1:20, for example from about 1:3 to about 1:15. When the ratio is less than 1:3, the resultant coating has insufficient flexibility. When the ratio is greater than 1:20, the cured films will have poorer salt spray corrosion resistance. The exemplary cyclic polyol-alkylene oxide condensates used in the coating compositions contemplated herein are believed to have the following structural formula:

where R is a cyclic radical, m is equal to 0 to 18, n is equal to 1 to 15, n plus m is equal to 1 to 20, X is an alkylene radical of 3 to 8 carbon atoms, and Z is equal to 2 to 3.

The polyepoxide and the polyether polyol can be contacted by simply mixing the two together, optionally in the presence of a solvent such as aromatic hydrocarbons, for example, toluene, xylene and ketones, such as, methyl ethyl ketone and methyl isobutyl ketone. In an exemplary embodiment, the polyepoxide and the polyether polyol are heated together, for example at a temperature of at least 75° C. (167° F.), for example, at least 90° C. (194° F.), such as 100 (212° F.) to 180° C. (356° F.), optionally in the presence of a catalyst, such as 0.05 to 2 percent by weight tertiary amines or quaternary ammonium bases. The duration of time that the polyepoxide and polyether polyol are heated together will vary depending on the amounts contacted, how the polyepoxide and polyether polyol are contacted, the degree of agitation, temperature, and the presence of catalyst. In general, when the polyepoxide and polyether polyol are contacted in an agitated reactor, the polyepoxide and polyether polyol are heated for a time sufficient to increase the epoxy equivalency of the reaction mixture. In an embodiment, the epoxy equivalency should be increased at least 25, for example at least 50, such as from about 75-150 percent over its original value; the epoxide equivalent being determined according to ASTM D-1652 (gram of resin solids containing 1-gram-equivalent of epoxide). In an embodiment, the ratio of equivalents of active hydrogen, e.g., hydroxyl, in the polyether polyol to equivalents of 1,2-epoxy in the polyepoxide should be about less than 1:1, for example about 0.1:1 to about 0.8:1, such as about 0.3:1 to about 0.6:1.

The polyepoxide and the polyether polyol are contacted and heated together to form a resinous reaction product or resin. Although the nature of the resinous reaction product is not completely understood, it is believed to be a mixture of about 15 to about 45 percent by weight of a chain-extended polyepoxide, that is, polyepoxide molecules linked together with polyether polyol molecules and about 55 to about 85 percent by weight of unreacted polyether polyol and unreacted polyepoxide or polyepoxide reacted with itself.

In another exemplary embodiment, the polymeric polyol used in forming the film-forming binder is a polyester polyol. Polyester polyols can be prepared by polyesterification of organic polycarboxylic acids or anhydrides thereof with organic polyols containing primary or secondary hydroxyls. Usually the polycarboxylic acids and polyols are aliphatic or aromatic dibasic acids and diols. The diols that are usually employed in making the polyester include alkylene glycol, such as ethylene glycol and butylene glycol, neopentyl glycol and other glycols such as cyclohexanedimethanol.

The acid component of the polyester consists primarily of monomeric carboxylic acids or anhydrides having 2 to 28 carbon atoms per molecule. Among the acids that are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and the like. Where acids are referred to above, it is understood that the anhydrides of those acids that form anhydrides can be used in place of acid.

In addition to polyester polyols formed from polybasic acids of polyols, lactone polyesters can also be employed. These products are formed from the reaction of lactone such as epsilon-caprolactone with a polyol. The polylactone polyols that are obtained from this reaction are characterized by the presence of terminal hydroxyl groups and recurring polyester moieties derived from the lactone, that is,

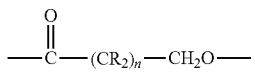

wherein n is at least 4, for example from 4 to 6, and at least n+2 R substituents are hydrogen and the remaining R substituents are selected from the group consisting of hydrogen, alkyl, cycloalkyl, and alkoxy, none of the R substituents contain more than 12 carbon atoms and the total number of carbon atoms in the substituents in the lactone ring does not exceed 12.

The lactone used as the starting material may be any lactone, or combination of lactones, having at least 6 carbon atoms, for example, from 6 to 8 carbon atoms in the ring and at least two hydrogen substituents on the carbon atom that is attached to the oxy group in the ring. The lactone used as the starting material can be represented by the following general formula:

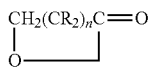

where n and R have the meanings referred to above.

Exemplary lactones useful herein are the epsilon-caprolactones in which n equals 4 in the above structure. In an embodiment, the lactone is unsubstituted epsilon-caprolactone, in which n equals 4 and all of the R substituents in the above structure are hydrogen. Epsilon-caprolactone is particularly useful because it is readily available in commercial quantities and gives excellent coating properties. Various lactones may be utilized individually or in combination. The polycaprolactone polyols suitable for use herein have molecular weights of from about 530 to about 2000 Daltons.

Examples of suitable aliphatic diols include ethylene glycol, 1,3-propanediol, 1,4-butanedio, 1,5-pentanediol, 1,6-hexanediol, 1,10-decanediol and 1,4-cyclohexanedimethanol. An example of suitable aliphatic triol is trimethylolpropane. The suitable polycaprolactone polyols have molecular weights of from about 530 to about 2000.

Polymerization of the lactone may be initiated by reaction with an organic polyol containing primary hydroxyls. Organic polyols that are particularly suitable for use herein are aliphatic diols and triols such as alkylene diols containing from 2 to 10 carbon atoms.

The resinous reaction product of the polyepoxide and the polymeric polyol may be reacted with a cationic group former, for example, an amine Exemplary amines used to adduct the epoxy resin are monoamines, particularly secondary amines with primary hydroxyl groups. When reacting the secondary amine containing the primary hydroxyl group with the terminal epoxide groups in the polyepoxide, the result is the amine/epoxy adduct in which the amine has become tertiary and contains a primary hydroxyl group. Examples of useful amines include diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are particularly useful.

In addition to the amines disclosed above, a portion of the amine that is reacted with the polyepoxide-polyol product can be the ketimine of a polyamine. The ketimine groups will decompose upon dispersing the amine-epoxy reaction product in water resulting in free primary amine groups that would be reactive with curing agents. Ketimines useful herein are prepared from ketones and primary amines. The water formed is removed, for example by azeotropic distillation. Useful ketones include dialkyl, diaryl and alkylaryl ketones having 3-13 carbon atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diaminopropane, 1,4-diaminobutane, 1,6-diaminohexane, 4,9-dioxadodecone, 1,12-diamine and the like. A particularly useful ketamine is diketimine, which is the ketamine of diethylene triamine and methyl isobutyl ketone. Mixtures of the various amines also can be used.

The reaction of the secondary amine with the resinous reaction product of the polyepoxide and the polymeric polyol takes place upon mixing the amine with the polyepoxide. The reaction can be conducted neat, or, optionally in the presence of suitable solvent. The reaction may be exothermic and cooling may be desired. However, heating to a moderate temperature, that is, from about 50° C. (122° F.) to about 150° C. (302° F.) may be used to hasten the reaction. The reaction product may have a weight average molecular weight of about 2000 Daltons, in an embodiment.

The resulting epoxy amine adduct is provided as an organic solvent-borne film-forming binder, wherein the water content of such organic solvent is less than about 20 wt. % of the overall solvent. Suitable organic solvents include those typically known to the coatings industry, for example $C_1$-$C_4$ alcohols such as isopropanol, isobutanol, n-butanol, n-propanol, and glycol ethers such as isopropyl glycol, butyl glycol, methyl diglycol, ethyl diglycol, butyl diglycol, ethyl triglycol, butyl triglycol, methoxypropanol, ethoxypropanol, propoxypropanol, butoxypropanol, methoxybutanol, propylene glycol dimethyl ether, dipropylene glycol dimethyl ether, diethylene glycol dimethyl ether, and dipropylene glycol monomethyl ether.

As noted above, the film-forming binder of the principal emulsion used to form a 1K coating composition contemplated herein is an epoxy amine adduct and a blocked polyisocyanate crosslinking agent dispersed in the solvent medium. Examples of blocked polyisocyanate crosslinking agents suitable for use in the film-forming binder are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams that block the isocyanate functionality, i.e., the crosslinking functionality. In an exemplary embodiment, a mixture of blocking agents is methanol, ethanol and diethylene glycol monobutyl ether. Upon heating, the blocking agents separate, thereby providing a reactive isocyanate group, and crosslinking occurs. An exemplary film-forming binder of the composition contains about 40-60% by weight epoxy amine adduct and about 60-40% by weight blocked isocyanate. In an exemplary embodiment, the epoxy amine adduct and blocked isocyanate are the principal resinous ingredients in the coating composition. The blocked isocyanate may be about 20 wt. % to about 30 wt. % of the overall solids content.

As further noted above, the film-forming binder of the principal emulsion used to form a 2K coating composition contemplated herein is an epoxy amine adduct and an unblocked polyisocyanate crosslinking agent dispersed in the solvent medium. Examples of unblocked polyisocyanate crosslinking agents suitable for use in the film-forming binder are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are not pre-reacted with any blocking agents. An exemplary film-forming binder of the composition contains about 40-60% by weight epoxy amine adduct and about 60-40% by weight unblocked isocyanate. In an exemplary embodiment, the epoxy amine adduct and unblocked isocyanate are the principal resinous ingredients in the coating composition. The unblocked isocyanate may be about 20 wt. % to about 30 wt. % of the overall solids content, such as about 25 wt. %.

In addition to the film-forming binder described above, the coating composition contemplated herein may further contain pigment that is incorporated into the composition in the form of a pigment paste. An exemplary pigment paste is prepared by grinding or dispersing a pigment into a grinding resin and optional ingredients such as wetting agents, surfactants, and defoamers. Any of the pigment grinding resins that are well known in the art can be used. After grinding with the grinding resin, the particle size of the pigment should be as small as practical, for example, the particle size may be about 6-8 using a Hegman grinding gauge. In an exemplary embodiment, the pigment paste has a nonvolatile solids content of at least 30 wt. % based on the total weight of the coating composition, for example, 40 wt. %, based on the total weight of the coating composition.

Pigments that can be used in the coating composition contemplated herein include titanium dioxide, basic lead silicate, strontium chromate, carbon black, iron oxide, zinc hydroxy phosphite, lead, bismuth, tin, clay and the like. Pigments with high surface areas and oil absorbencies should be used judiciously because these can have an undesirable effect on coalescence and flow of the coating composition.

In exemplary embodiments, the pigment-to-film-forming binder weight ratio is, for example, less than 0.5:1, for example less than 0.4:1, such as about 0.2 to 0.4:1. Higher pigment-to-film-former binder weight ratios have been found to adversely affect coalescence and flow.

The coating composition contemplated herein can contain optional ingredients such as, for example, wetting agents, surfactants, defoamers, anti-crater additives, and the like. Examples of surfactants and wetting agents include alkyl imidazolines, acetylenic alcohols available from Air Products and Chemicals, Inc. of Allentown, Pa. as "Surfynol® 104," and ethoxylated styrenated phenols such as "Syn Fac® 8334" available from Milliken Chemical of Spartanburg, S.C. These optional ingredients, when present, constitute from about 0.1 to 20 percent by weight of the film-forming binder of the coating composition.

Optionally, plasticizers can be used to promote flow. Examples of useful plasticizers are high boiling point water immiscible materials such as ethylene or propylene oxide adducts of nonyl phenols or bisphenol A. Plasticizers are usually used at levels of about 0.1 to 15 percent by weight of the film-forming binder of the coating composition.

The coating composition contemplated herein is an organic solvent-borne dispersion. The term "dispersion" as used herein is a two-phase translucent or opaque resinous binder system in which the binder is the dispersed phase and the solvent is the continuous phase. The average particle size diameter of the binder phase is about 0.1 to about 10 microns, for example, less than 5 microns. In an exemplary embodiment, the coating composition contains a nonvolatile solids content of at least 40 wt. % based on the total weight of the coating compositions, for example, about 40 to about 80 wt. % nonvolatile solids, for example about 50 wt. % to about 70 wt. % nonvolatile solids. In this regard, the coating composition contemplated herein exhibits superior corrosion resistance than conventional coating compositions. The higher solids content of the coating compositions contemplated herein further translates into a lower VOC content than conventional coating compositions.

In accordance with an exemplary embodiment, and as noted above, a method for making a coating composition contemplated herein includes combining the polyepoxide and the polyether polyol, optionally in the presence of a solvent such as aromatic hydrocarbons, for example, toluene, xylene and ketones, such as, methyl ethyl ketone and methyl isobutyl ketone. The polyepoxide and the polyether polyol are heated together, for example at a temperature of at least 75° C. (167° F.), for example at least 90° C. (194° F.), such as 100 (212° F.) to 180° C. (356° F.), optionally in the presence of a catalyst such as 0.05 to 2 percent by weight tertiary amines or quaternary ammonium bases. The time the polyepoxide and polyether polyol are heated together will vary depending on the amounts contacted, how they are contacted, the degree of agitation, temperature, and the presence of catalyst. The reaction is allowed to peak at the exothermic temperature. The oven is cooled to a temperature of from about 149° C. (300° F.) to about 177° C. (350° F.), for example about 160° C. (320° F.) where it remains for about an hour. The temperature of the oven is adjusted and when the batch cools to a temperature of from about 135° C. (275° F.) to about 163° C. (325° F.), for example 149° C. (300° F.), a crosslinking agent is blended into the batch for a time sufficient to obtain a homogeneous mixture. The batch is further cooled to a temperature of from about 93° C. (200° F.) to about 121° C. (250° F.), for example to about 107° C. (225° F.), and a cationic group former, such as an amine, is added. The temperature of the batch is raised to a temperature of from about 50° C. (122° F.) to about 150° C. (302° F.), for example about 121° C. (250° F.).

In an exemplary embodiment, a pigment paste next is formulated. A grind resin is combined with organic solvent and a non-surfactant to achieve a homogeneous mixture. A pigment is added to the mixture and blending is continued. Additional solvent may be added. The mixture is ground at a temperature of from 27° C. (80° F.) to 38° C. (100° F.), for example 32° C. (90° F.) until a Hegman reading of greater than 7 is achieved. As noted above, the pigment paste and the film-forming binder are then combined in a pigment-to-film-forming binder weight ratio of, for example, less than about 0.5:1, for example less than about 0.4:1, such as about 0.2:1 to 0.4:1.

Accordingly, coil coating compositions are provided. The coil coating compositions include an organic solvent carrier and a film-forming binder dispersed in the organic solvent carrier. The film-forming binder comprise an epoxy-amine adduct and a blocked polyisocyanate crosslinking agent, in the case of a 1K system, or an unblocked polyisocyanate crosslinking agent, in the case of a 2K system. The film-forming binder has associated amine groups until subjected to a temperature of at least about 165.5° C. (330° F.). In addition, the coil coating composition comprises a pigment and a grinding resin. The coil coating composition has a solids content of at least about 50 weight percent based on a total weight of the coating composition. In this regard, the coil coating composition provides better corrosion resistance that conventional coil coating compositions and a lower VOC content, for example greater than 1000 hours salt spray resistance and greater than 200 MEK rubs resistance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A coating composition comprising:
   an organic solvent-based carrier that comprises less than about 20% by weight water;
   a film-forming binder dispersed in the organic solvent-based carrier, the film-forming binder comprising an epoxy-amine adduct and a blocked or unblocked polyisocyanate crosslinking agent, wherein the film-forming binder has associated amine groups until subjected to a temperature of at least about 165.5° C. (330° F.);
   a pigment; and
   a grinding resin,
   wherein the coating composition has a solids content of at least about 50 wt. % based on a total weight of the coating composition.

2. The coating composition of claim 1, wherein the coating composition has the solids content of from about 50 wt. % to about 70 wt. % based on the total weight of the coating composition.

3. The coating composition of claim 1, wherein the coating composition has the solids content of at least about 70 wt. % based on the total weight of the coating composition.

4. The coating composition of claim 1, wherein the epoxy-amine adduct comprises a reaction product of a polyepoxide and a polyether polyol.

5. The coating composition of claim 4, wherein the polyepoxide is a polyglycidyl ether of a cyclic polyol.

6. The coating composition of claim 4, wherein the polyepoxide comprises a bisphenol A/epichlorohydrin-derived liquid epoxy resin.

7. The coating composition of claim 1, wherein the epoxy-amine adduct comprises a monoamine.

8. The coating composition of claim 7, wherein the monoamine is chosen from the group consisting of diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, and dibutyl amine.

9. The coating composition of claim 7, wherein the epoxy-amine adduct comprises a ketimine of a polyamine.

10. The coating composition of claim 1, wherein the blocked polyisocyanate crosslinking agent is chosen from the group consisting of aliphatic, cycloaliphatic and aromatic isocyanates.

11. The coating composition of claim 1, wherein a pigment-to-film-forming binder weight ratio is less than about 0.5:1.

12. A method for coil coating a metal coil, the method comprising the steps of:
    unwinding a metal strip from a coil thereof;
    cleaning the metal strip;
    coating at least one surface of the metal strip with a coating composition to form a coated metal strip, the coating composition comprising:
      an organic solvent-based carrier that comprises less than about 20% by weight water;
      a film-forming binder dispersed in the organic solvent-based carrier, the film-forming binder comprising an epoxy-amine adduct and a blocked or unblocked polyisocyanate crosslinking agent, wherein the film-forming binder has associated amine groups until subjected to a temperature of at least about 165.5° C. (330° F.);
      a pigment; and
      a grinding resin,
      wherein the coating composition has a solids content of at least about 50 weight percent based on a total weight of the coating composition; and
    heating the coated metal strip.

* * * * *